(12) United States Patent
Cheng et al.

(10) Patent No.: US 7,633,199 B2
(45) Date of Patent: Dec. 15, 2009

(54) DIRECT DRIVE TORQUE MOTOR

(75) Inventors: Fu-Yuan Cheng, Taichung (TW);
Chih-Hsien Chao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 304 days.

(21) Appl. No.: 11/833,820

(22) Filed: Aug. 3, 2007

(65) Prior Publication Data
US 2009/0033273 A1 Feb. 5, 2009

(51) Int. Cl.
*H02K 7/10* (2006.01)
(52) U.S. Cl. .............................. 310/77; 310/93; 310/98
(58) Field of Classification Search ............... 310/75 D, 310/79–80, 77, 92–93, 89–90, 68 B, 98, 52
See application file for complete search history.

(56) References Cited

U.S. PATENT DOCUMENTS

| | | | | |
|---|---|---|---|---|
| 6,129,193 | A * | 10/2000 | Link ........................... | 192/84.1 |
| 6,305,506 | B1 * | 10/2001 | Shirai et al. ................. | 188/72.2 |
| 6,315,092 | B1 * | 11/2001 | Schwarz ..................... | 188/265 |
| 6,355,996 | B1 * | 3/2002 | Birkestrand .................. | 310/54 |
| 6,868,323 | B2 * | 3/2005 | Kichima et al. .............. | 701/70 |
| 7,259,493 | B2 * | 8/2007 | Oshidari et al. ....... | 310/216.114 |
| 7,474,025 | B1 * | 1/2009 | Cheng et al. .................. | 310/90 |
| 2005/0247528 | A1 * | 11/2005 | Schack et al. .............. | 188/72.8 |
| 2007/0257570 | A1 * | 11/2007 | Walter et al. .............. | 310/67 R |
| 2007/0296281 | A1 * | 12/2007 | Choi ........................... | 310/12 |
| 2009/0032335 | A1 * | 2/2009 | Cheng et al. ................. | 184/5.1 |
| 2009/0032336 | A1 * | 2/2009 | Cheng et al. .................... | 184/6 |
| 2009/0032363 | A1 * | 2/2009 | Cheng et al. ............. | 192/18 A |

\* cited by examiner

*Primary Examiner*—Thanh Lam
(74) *Attorney, Agent, or Firm*—Banger Shia

(57) ABSTRACT

A direct drive torque motor comprises: a body, a direct drive torque motor, a main shaft, a bearing assembly, a brake assembly, a cooling assembly, and a position-sensing assembly. The bearing assembly is used to position the main shaft in the direct drive torque motor and the body. The brake assembly is disposed between the body and the main shaft. The cooling assembly is located in the body to cool the torque motor. The position-sensing assembly is mounted on the body for sensing the rotation of the main shaft and then controls the drive of the direct drive torque motor. With above arrangements, the direct drive torque motor can be used on various machines that need to rotate to perform various angle control, rotation control and accuracy control, it can improve the life and the modular application of the product.

6 Claims, 4 Drawing Sheets

DIRECT DRIVE TORQUE MOTOR

BACKGROUND OF THE INVENTION

1. Field of the Invention

The present invention relates to a motor, and more a direct drive torque motor which is used for various angle controlling, rotation speed controlling and precision controlling, thus the product can be improved in life and is adapted for modular application.

2. Description of the Prior Art

The motors are used more and more widely in modern industries, and are generally categorized into external rotor, internal rotor and so on. In addition to the high precision in the feeding transmission, the motor also has the advantages of low friction loss, high energy conversion efficiency and low noise, etc. Hence, the motor is obviously important to the modern industrial tool machines.

The existing direct drive motors are applied to the drive of the axis equipments, such as the automatic equipment, the indexing plate and each kind of tool machine. With reference to FIGS. 1 and 2, a clearance eliminating structure for the main shaft of a conventional direct drive torque motor utilizes the coil 101 of an outer stator 10 to closely cooperate with the magnet 111 of the inner rotor 11. A shaft 12 is fixed in the center of the inner rotor 11. The outer stator 10 includes an annular base 102, an annular aluminum sheet 103, a silicon steel sheet 104 and the coil 101 that are arranged sequentially from the outer to the inner periphery of the outer stator 10. Thought it has been brought into use, this design still has the following disadvantages:

First, this conventional direct drive torque motor can drive the fixed shaft 12 of the inner rotor 11, but it still has to use the coil 101 of the outer stator 10 to cooperate with the magnets 111 of the inner rotor 11 to carry out the operation control of starting or stopping the rotation. However, this simple operation control doesn't have a precision rotating and stopping control mechanism for precisely controlling and stopping the rotation, so it is unsuitable for use in various precision controls (such as circular motion control and angle decomposition).

Second, since the conventional direct drive torque motor is not provided with a position sensing assembly, through the direct drive motor can drive the fixed shaft 12 of the inner rotor 11 to rotate, the rotation angle and the number of revolutions of the shaft 12 is unavailable. Further, there is no appropriate method existing to install the aforementioned assemblies on the conventional direct drive torque motor.

Third, this conventional direct drive torque motor must be mounted on a machine to carry out rotating operation and is not adapted for modular application since its heavy body is undetachable. Further, the market is awaiting new products which can be easily and independently used for various angle controlling, rotation speed controlling and precision controlling.

Fourth, if the conventional direct drive torque motor is mounted on a machine to carry out rotating operation, there are no appropriate assemblies that can be used to support the inner rotor and the shaft, it is likely to cause abrasion to the components and considerably affect the life of the product.

The present invention has arisen to mitigate and/or obviate the afore-described disadvantages.

SUMMARY OF THE INVENTION

The primary objective of the present invention is to provide a direct drive torque motor which is precisely controllable.

To achieve the abovementioned objective, a direct drive torque motor in accordance with the present invention comprises: a body, a direct drive torque motor, a main shaft, a bearing assembly, a brake assembly, a cooling assembly, and a position-sensing assembly. The bearing assembly is used to position the main shaft in the direct drive torque motor and the body. The brake assembly is disposed between the body and the main shaft. The cooling assembly is located in the body to cool the torque motor. The position-sensing assembly is mounted on the body for sensing the rotation of the main shaft and then controls the drive of the direct drive torque motor. With above arrangements, the present invention can be independently used for various angle controlling, rotation speed controlling and precision controlling.

The secondary objective of the present invention is to provide a direct drive torque motor which is improved in life and adapted for modular application.

To achieve the abovementioned objective, the torque motor is positioned in the body of the direct drive torque motor, and then the main shaft is positioned in the direct drive torque motor, and finally a plurality of bearings and bearing seats are arranged between the body and the main shaft. With these arrangements, the direct drive torque motor of the present invention is adapted for modular application and can be used independently from large-scale machine. Further, the bearing assembly stably supports the operation of the body, the main shaft and the direct drive torque, so as to effectively reduce the abrasion while improving the service life of the product.

The abovementioned brake assembly can be a pressure cylinder disposed between the main shaft and the body, and the body is inputted with pressure to make the pressure cylinder press the main shaft, so as to produce a braking effect. Such a brake technology is within the scope of the present invention.

Since the present invention is detachable and adapted for modular application, the quantity and position of the bearings and bear seats between the body and the main shaft have no relation to the characteristic of the present invention. The present invention can use bearings and bearing seats of different sizes and different types, such as the general roller bearing or rolling ball bearing.

In addition, the main shaft is provided a plurality of stages tapered from one end to the other end of the main shaft, which allows the respective components to be assembled on the main shaft sequentially from one end to the other. And finally, an adjustment nut is used to position the respective components. Hence, with the tapered and staged structure of the main shaft, the respective components can be positioned and assembled or disassembled stably.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
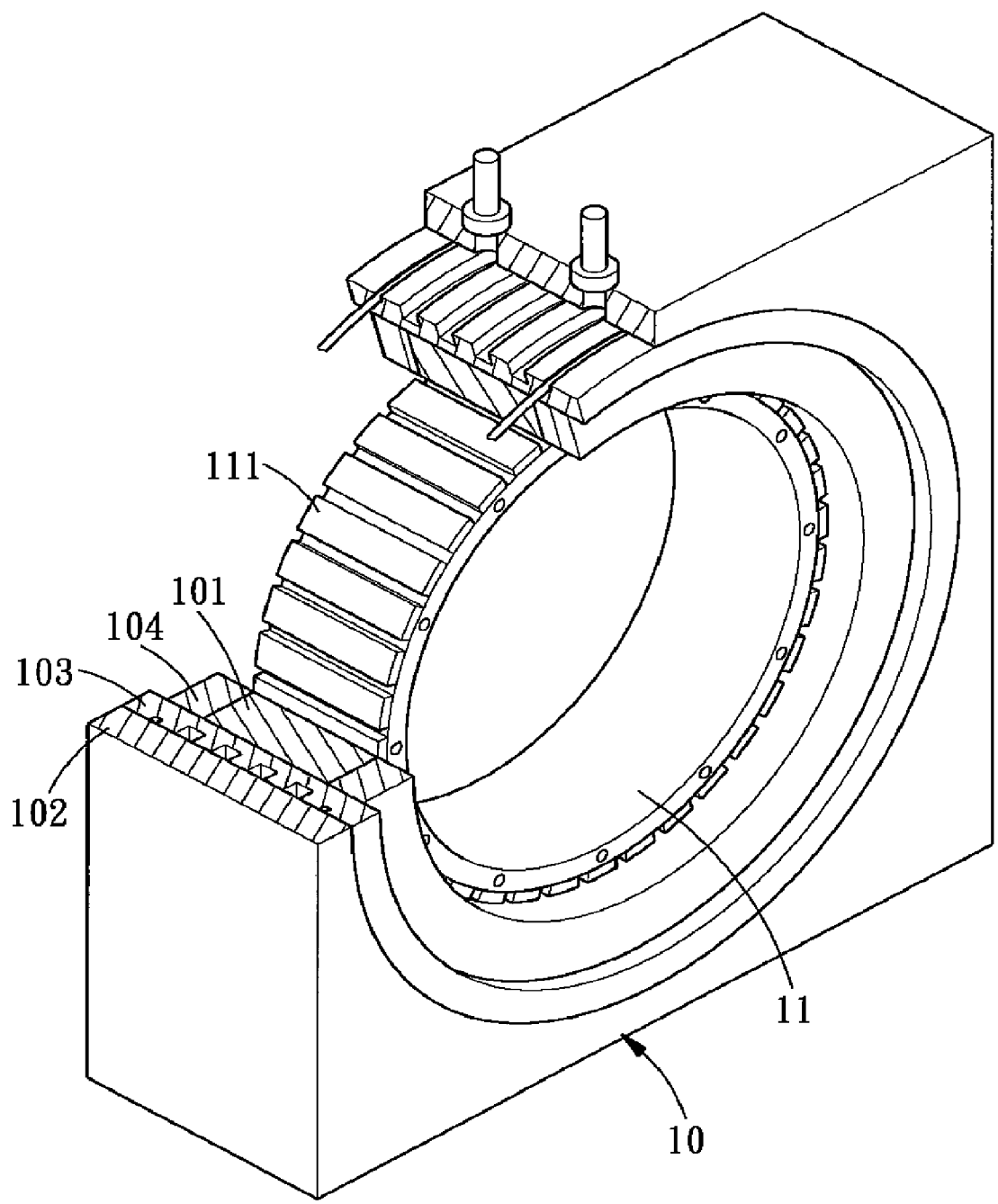
FIG. 1 is a cross sectional view of a part of a conventional direct drive torque motor.
Figure 2:
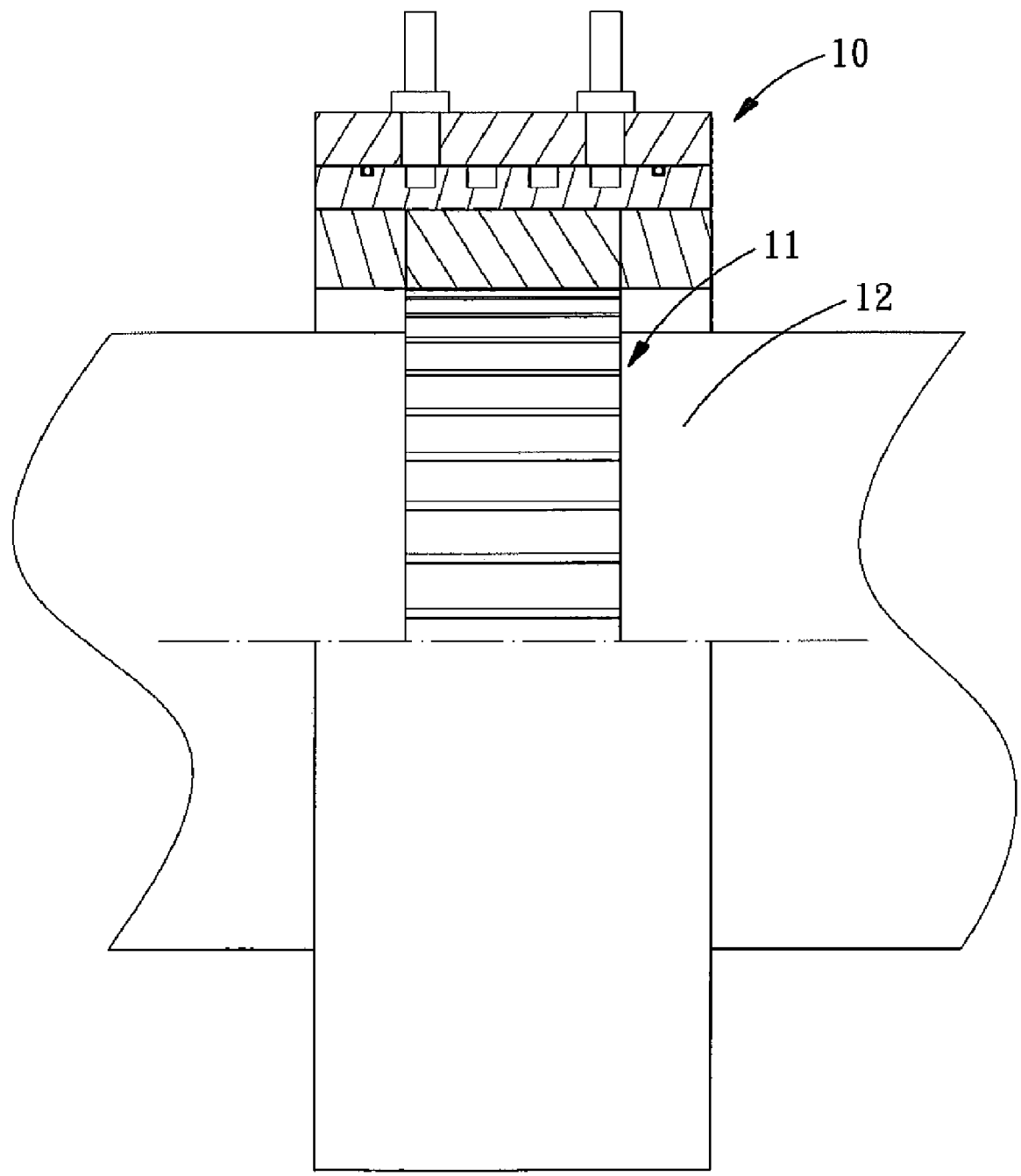
FIG. 2 is another cross sectional view of a conventional direct drive torque motor.
Figure 3:
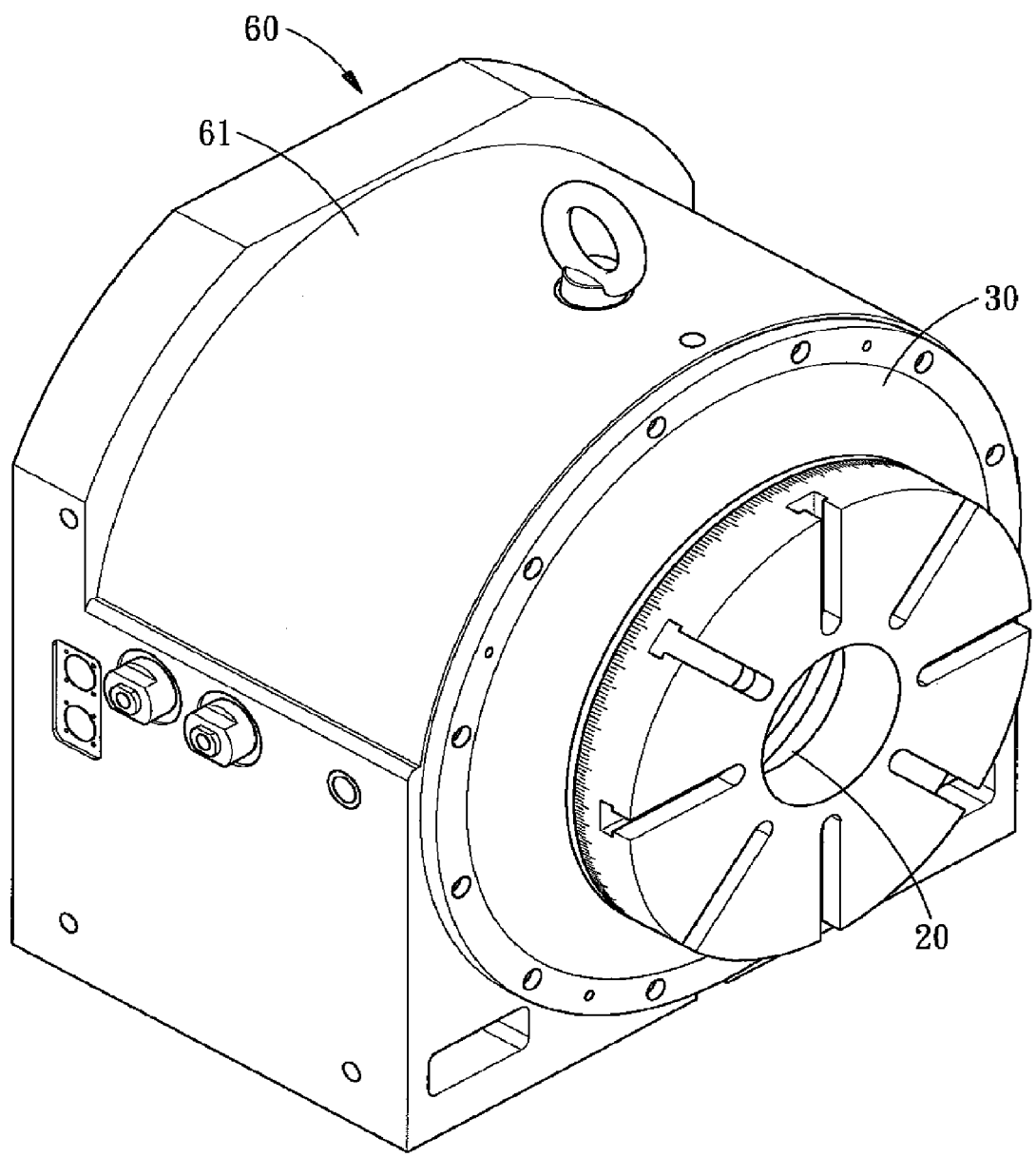
FIG. 3 is a perspective view of a direct drive torque motor in accordance with the present invention.
Figure 4:
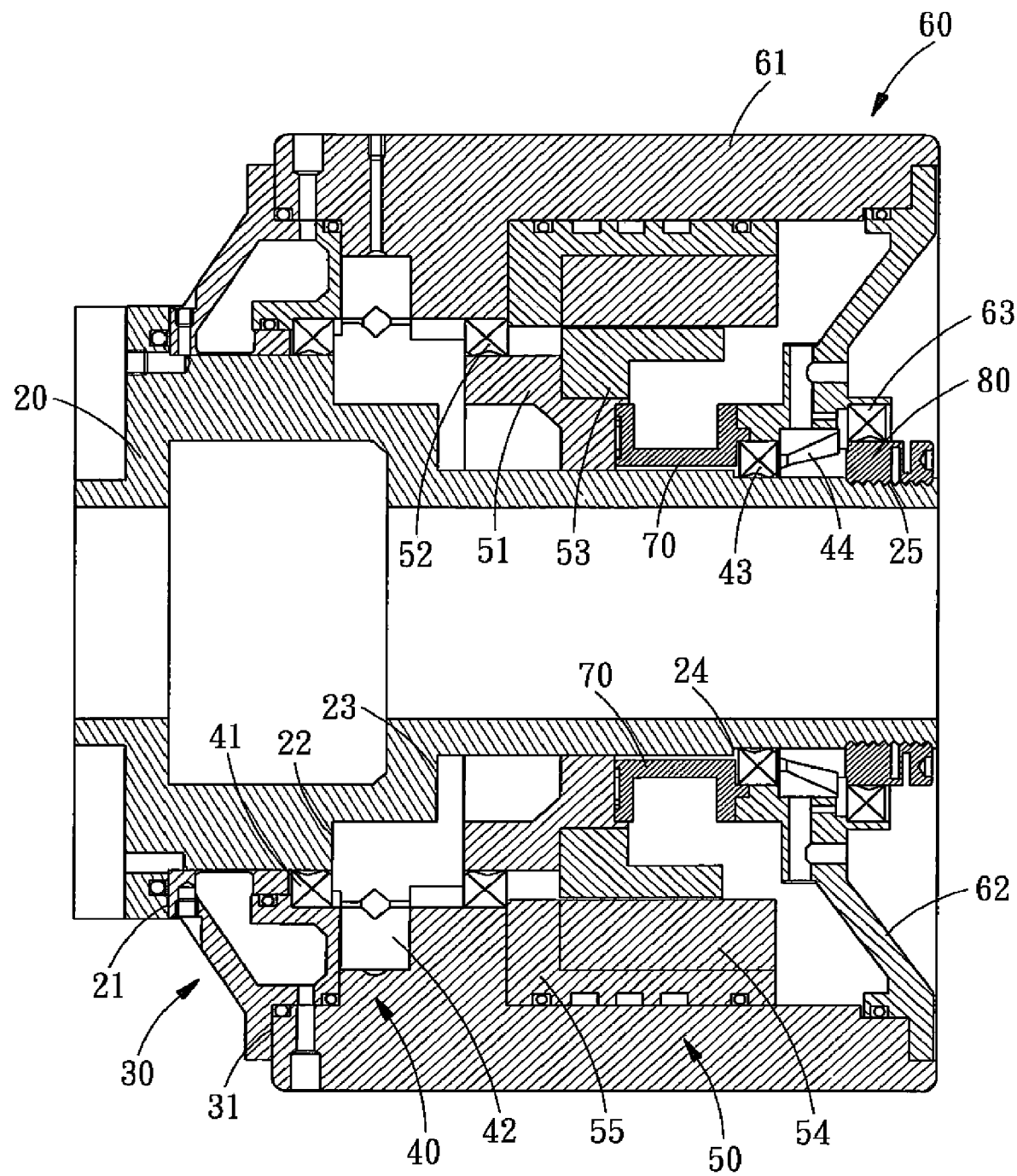
FIG. 4 is a cross sectional view of the direct drive torque motor in accordance with the present invention.

Referring to FIGS. 3 and 4, a direct drive torque motor in accordance with the present invention comprises: a main shaft 20, a brake assembly 30, a direct drive torque motor 40, a position-sensing assembly 50 and a body 60.

The outer surface of the main shaft 20 includes a first stage 21, a second stage 22, a third stage 23, a fourth stage 24 and an external thread portion 25 that are successively tapered from one end to the other end of the main shaft 20. The external thread portion 25 is formed at one end of the main shaft 20.

The inner side of the brake assembly 30 is positioned against the first stage 21 of the main shaft 20, and the outer side of the brake assembly 30 includes a positioning portion 31. The brake assembly 30 utilizes its high internal-pressure caused deformation to press the main shaft 20, thus producing a braking effect.

The bearing assembly 40 includes a first oil seal 41, a main bearing 42, a second oil seal 43 and an assistant roller bearing 44. The first oil seal 41 is disposed between the brake assembly 30 and the main shaft 20. The main bearing 42 is located on the second stage 22 of the main shaft 20 and positioned against the brake assembly 30. The second oil seal 43 is located on the third stage 23 of the main shaft 20. The assistant roller bearing 44 is a tapered roller bearing which is located on the fourth stage 24 and abuts against second oil seal 43.

The direct drive torque motor 50 includes a mover-fixing seat 51, a mover oil seal 52, a mover 53, a stator 54 and a motor-cooling seat 55 (an embodiment of a cooling assembly of the present invention). The mover-fixing seat 51 is positioned against one side of the main bearing 42 of the bearing assembly 40. The mover oil seal 52 and the mover 53 are fixed outside the mover-fixing seat 51. The stator 54 is fixed in the motor-cooling seat 55 and is mounted on the mover 53.

The body 60 includes a shell member 61, a rear cover 62 and a rear cover oil seal 63. The shell member 61 is fixed with the rear cover 62. One end of the body 60 is fixed with the positioning portion 31 of the brake assembly 30. The body 60 and the main shaft 20 are positioned by the main bearing 42 of the bearing assembly 40. The rear cover 62 of the body 60 is positioned outside the oil seal 43 and the assistant roller bearing 44 of the bearing assembly 40. The rear cover oil seal 63 is disposed on the inner side of the bottom of the rear cover 62. The shell member 61 is located outside for an accommodation of all the abovementioned assemblies and used for fixing the motor-cooling seat 55 of the direct drive torque motor 50.

The position-sensing assembly 70 is fixed on the rear cover 62 of the body 60 and is located toward the mover-fixing seat 51 of the direct drive torque motor 50 for sensing the changes of the rotating position of the mover-fixing seat 51 caused by the main shaft 20.

The adjustment nut 80 is screwed on the external thread portion 25 of the main shaft 20 and located in the rear cover oil seal 63 of the body 60. Moreover, the nut 80 serves to press tightly against the assistant roller bearing 44 of the bearing assembly 40.

The aforementioned is the summary of the positional and structural relationship of the respective components of the preferred embodiment in accordance with the present invention.

For a better understanding of the present invention, its operation and function, reference should be made to the descriptions as follows:

Since the outer surface of the main shaft 20 includes the first stage 21, the second stage 22, the third stage 23, the fourth stage 24 and the external thread portion 25 that are successively tapered from one end to the other end of the main shaft 20, and the external thread portion 25 is formed at one end of the main shaft 20. The bearing assembly 40 positions the brake assembly 30, the direct drive torque motor 50, and the body 60 on the respective stages of the main shaft 20. And finally, the adjustment nut 80 is screwed on the external thread portion 25 of the main shaft 20 and serves to press tightly against the assistant roller bearing 44 of the bearing assembly 40.

Hence, the direct drive torque motor of the present invention is adapted for modular application and can be used independently from large-scale machine. Further, the bearing assembly 40 stably supports the operation of the body 60, the main shaft 20 and the direct drive torque 50, so as to effectively reduce the abrasion while improving the service life of the product.

The present invention further has the following characteristics:

First, The inner side of the brake assembly 30 is positioned against the first stage 21 of the main shaft 20, and the outer side of the brake assembly 30 includes a positioning portion 31. Therefore, the brake assembly 30 can utilize its high internal-pressure to produce a deformation to tightly press the main shaft 20, thus producing a braking effect.

Second, the direct drive torque motor 50 is provided with the motor-cooling seat 55 for accommodation of the stator 54, and the cooling assembly (the motor-cooling seat 55) is located in the body 60 to cool the direct drive torque motor 50.

Third, the position-sensing assembly 70 is fixed on the rear cover 62 of the body 60 and is located toward the mover-fixing seat 51 of the direct drive torque motor 50 to sense the changes of the rotating position of the mover-fixing seat 51 caused by the main shaft 20.

With the abovementioned designs, the present invention is adapted for modular application, can effectively cool the motor, and the position-sensing assembly 70 cooperates with the brake assembly 30 to control the rotation of the main shaft 20, hence the present invention can be independently used for various angle controlling, rotation speed controlling and precision controlling.

To summarize, the direct drive torque motor in accordance with the present invention comprises: a body, a direct drive torque motor, a main shaft, a bearing assembly, a brake assembly, a cooling assembly, and a position-sensing assembly. The bearing assembly is used to position the main shaft in the direct drive torque motor and the body. The brake assembly is disposed between the body and the main shaft. The cooling assembly is located in the body to cool the torque motor. The position-sensing assembly is mounted on the body for sensing the rotation of the main shaft and then controls the drive of the direct drive torque motor.

Therefore, the present invention can be used on various machines that need to rotate to perform various angle control, rotation control and accuracy control, it can improve the life and the modular application of the product.

While we have shown and described various embodiments in accordance with the present invention, it is clear to those skilled in the art that further embodiments may be made without departing from the scope of the present invention.

What is claimed is:

1. A direct drive torque motor comprising:
   a main shaft with plural stages and a external thread portion successively tapered from one end to the other end of the main shaft, the external thread portion being formed at an end of the main shaft;
   a brake assembly with an inner side positioned against the stages of the main shaft, and an outer side of the brake assembly being formed with a positioning portion;
   a bearing assembly including a plurality of oil seals, a main bearing, and an assistant roller bearing, the main bearing being positioned on the stages of the main shaft and pressed against the brake assembly, the assistant roller bearing being positioned on the stages of the main shaft;
   a direct drive torque motor mounted on the main shaft and positioned against one side of the main bearing of the bearing assembly, a cooling assembly being disposed in the direct drive torque motor;
   a body including a shell member and a rear cover, one end of the body being fixed with the positioning portion of the brake assembly, the body and the main shaft being positioned by the bearing assembly, the rear cover of the body being positioned on the assistant roller bearing of the bearing assembly, the shell member serving to fix the direct drive torque motor;
   a position-sensing assembly disposed in the body for sensing the rotation change of the main shaft; and
   an adjustment nut screwed on the external thread portion of the main shaft for driving the assistant roller bearing of the bearing assembly to press tightly against the assistant roller bearing of the bearing assembly.

2. The direct drive torque motor as claimed in claim 1, wherein the assistant roller bearing is a tapered roller bearing.

3. The direct drive torque motor as claimed in claim 1, wherein the brake assembly with an inner side positioned against the stage of the main shaft is interiorly defined with a pressure cylinder, a high internal pressure of which is utilized to produce deformation to press the main shaft, thus producing a braking effect.

4. The direct drive torque motor as claimed in claim 1, wherein the outer surface of the main shaft is formed with a first stage, a second stage, a third stage, and a fourth stage that are successively tapered from one end to the other end of the main shaft;
   a brake assembly is positioned against the first stage of the main shaft; and
   the bearing assembly further includes a first oil seal and a second oil seal, the first oil seal is disposed between the brake assembly and the main shaft, the main bearing is located on the second stage of the main shaft, the second oil seal is located on the third stage of the main shaft, the assistant roller bearing is located on the fourth stage and abuts against second oil seal.

5. The direct drive torque motor as claimed in claim 1, wherein the direct drive torque motor includes a mover-fixing seat, a mover oil seal, a mover, a stator and a motor-cooling seat, the mover-fixing seat is positioned against one side of the main bearing of the bearing assembly, the mover is mounted on the main shaft, the mover oil seal and the mover are fixed outside the mover-fixing seat, the stator is installed in the motor-cooling seat and is located outside the mover.

6. The direct drive torque motor as claimed in claim 5, wherein the position-sensing element is fixed on the rear cover of the body and is located toward the mover-fixing seat of the direct drive torque motor for sensing changes of the rotating position of the mover-fixing seat.

* * * * *